May 8, 1956    L. A. FALLIGANT    2,744,809
FUEL SYSTEMS FOR LIGHT PORTABLE GAS COMBUSTION BURNERS
Original Filed Aug. 30, 1948      4 Sheets-Sheet 1
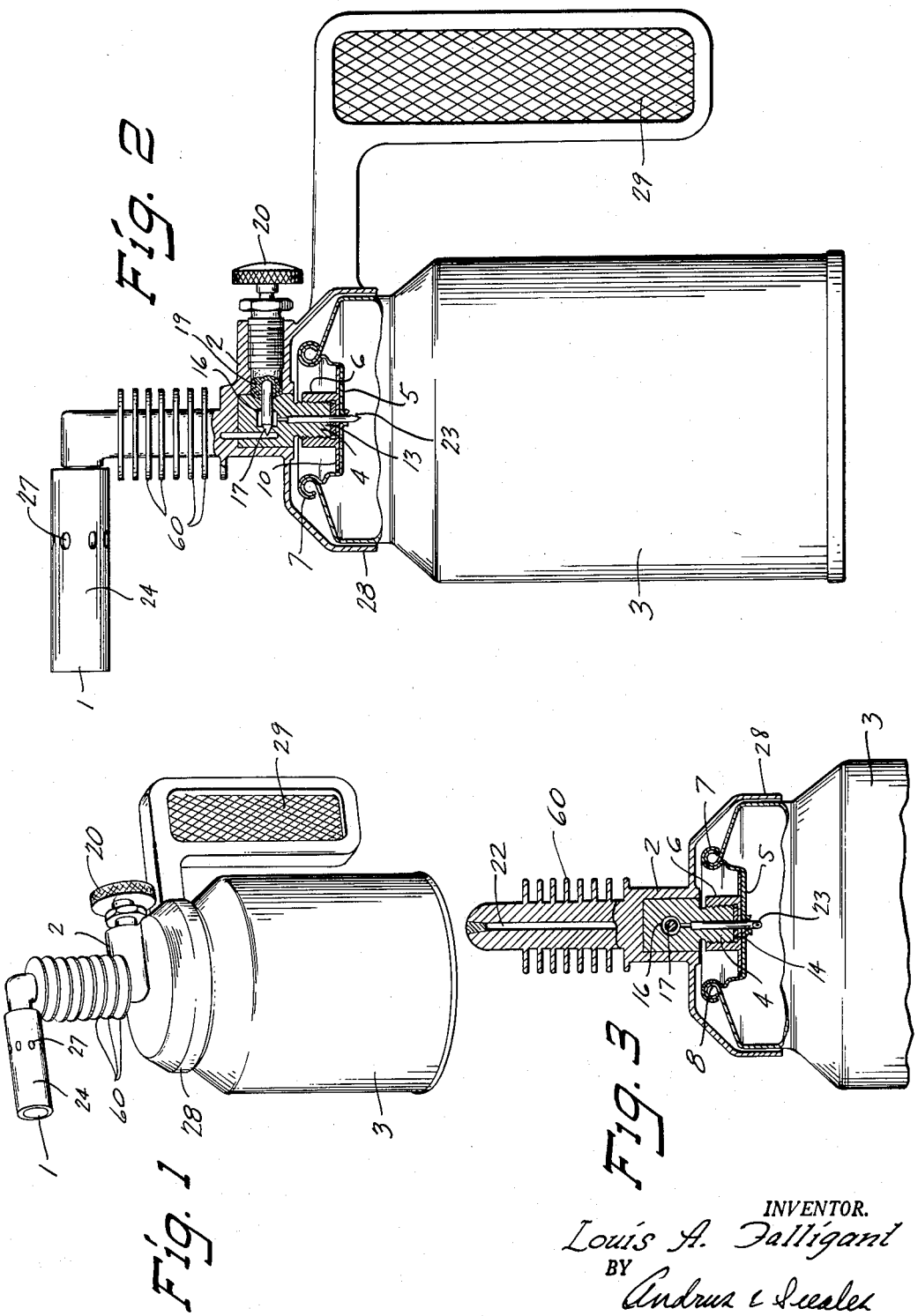
INVENTOR.
Louis A. Falligant
BY
Andrus & Sceales
Attorneys

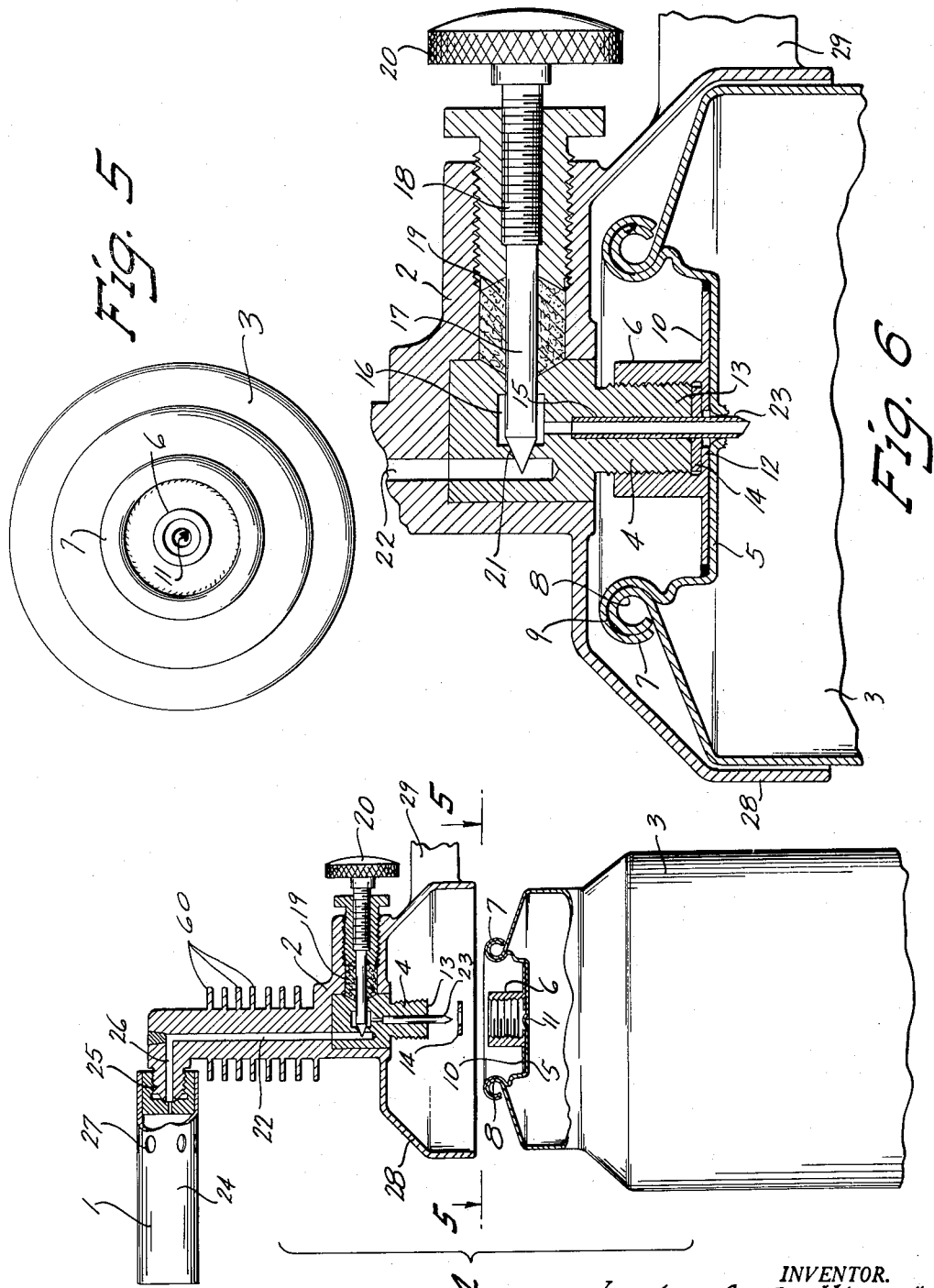

May 8, 1956 L. A. FALLIGANT 2,744,809
FUEL SYSTEMS FOR LIGHT PORTABLE GAS COMBUSTION BURNERS
Original Filed Aug. 30, 1948 4 Sheets-Sheet 3
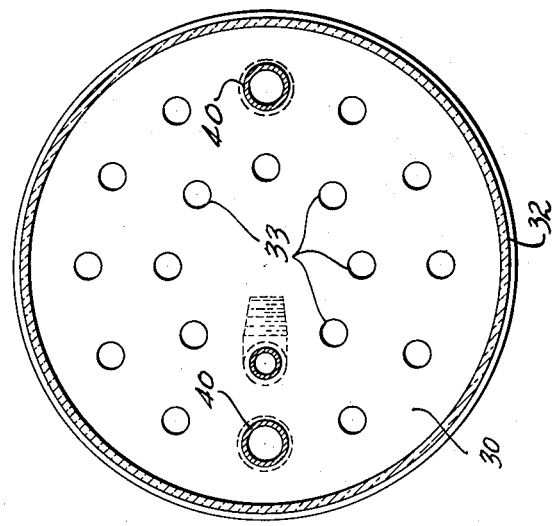
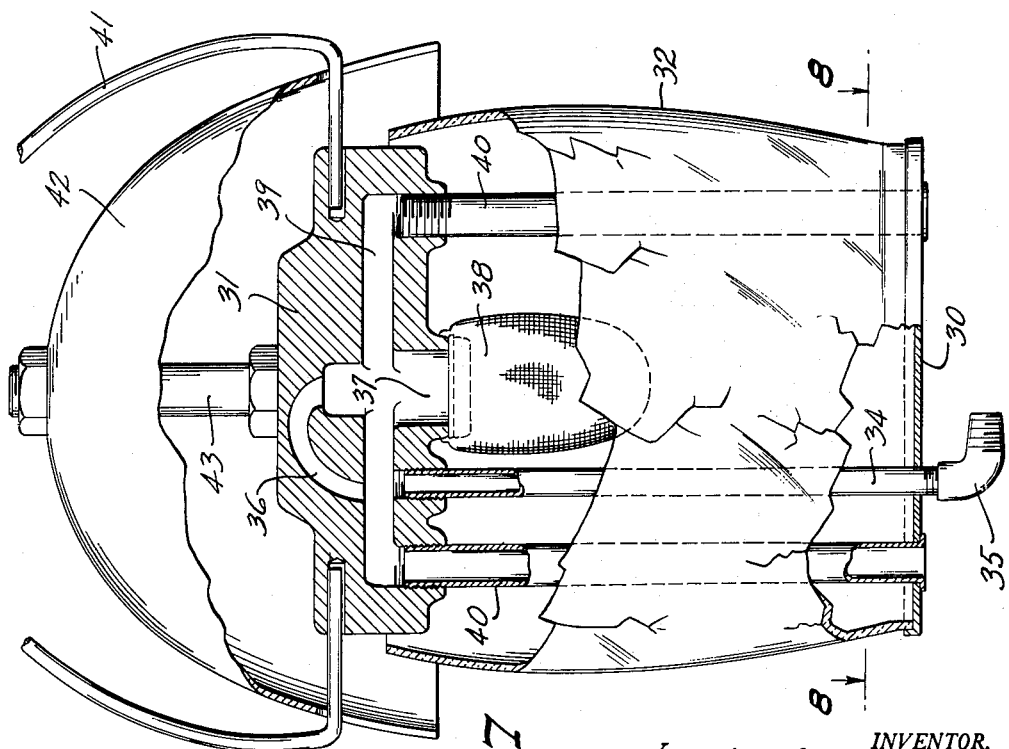
INVENTOR.
Louis A. Falligant
BY
Andrus & Sceales
Attorneys

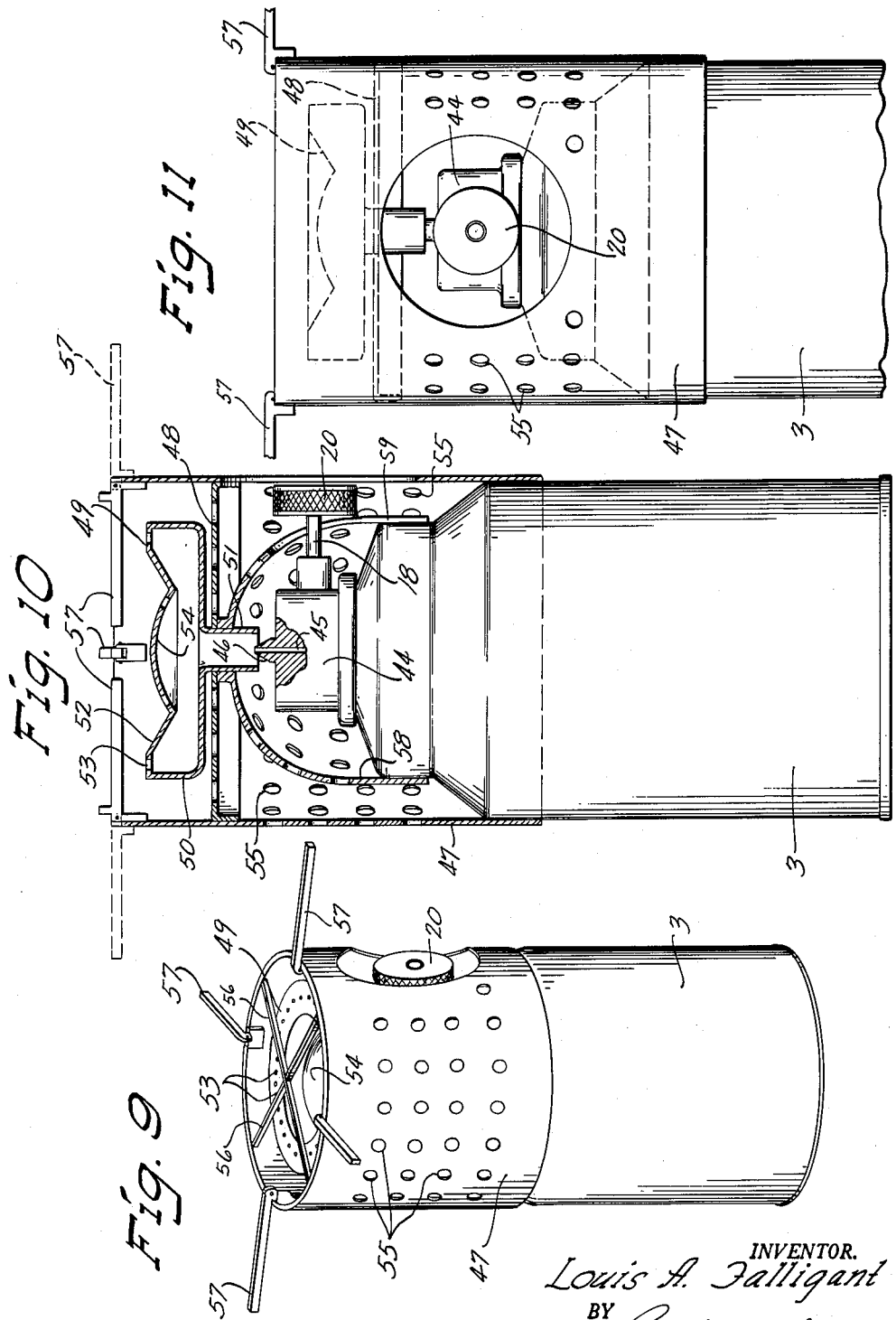

United States Patent Office 2,744,809
Patented May 8, 1956

2,744,809
FUEL SYSTEMS FOR LIGHT PORTABLE GAS COMBUSTION BURNERS

Louis A. Falligant, Prairie View, Ill., assignor to Prepo Corporation, a corporation of Delaware Continuation of application Serial No. 46,917, August 30, 1948. This application December 9, 1952, Serial No. 324,890

The portion of the term of the patent subsequent to July 13, 1971, has been disclaimed and dedicated to the public 2 Claims. (Cl. 62—1)

This invention relates to fuel systems for light portable gas combustion burners. This application is a continuation of application Serial No. 46,917, filed August 30, 1948, by the present inventor for Fuel Systems for Light Portable Gas Combustion Burners, now abandoned in favor of the present application. The invention is adapted for blow torches, lanterns, camp cook stoves and the like, and automatically generates the required gas pressure in each instance.

One of the principal objects of the invention is to provide small replaceable disposable fuel cartridges which employ a self-pressurizing liquid fuel having the characteristic of burning with a luminous flame when ejected as a liquid through an orifice at normal room temperatures and of rapidly increasing vapor pressure under operating temperature increases.

Another object is to provide simple control mechanism attached to the burner adapted to automatically puncture the sealed cartridge upon assembly therewith and thereby eliminate expensive valve controls on the cartridge.

Another object of the invention is to provide a simple and practical means for generating an initial starting pressure for such a fuel cartridge when assembled with a burner and when the vapor pressure of the liquid is too low for burner starting purposes.

Another object is to provide a simple construction for maintaining the required gas pressure without pumping of air into the fuel tank.

Another object is to greatly increase the safety of operation of light-weight portable gas burners of the type referred to.

Another object is to increase the safety of fuel transportation for light-weight portable gas burners and provide a sealed fuel cartridge which can be carried and shipped without danger and which is conveniently ready and available for assembly in the burner unit at any time.

Another specific object is to provide an automatic fuel supply for blowtorches, lanterns and small portable heating equipment.

The invention is based upon the conception that small replaceable fuel cartridges of self-pressurizing liquid fuel may be employd in light-weight portable burners of the type referred to, and that where the fuel has an initial boiling point within a temperature range of 30° F. to 50° F. the natural refrigeration of the evaporating fuel and the heat of the burner effecting the necessary vaporization will reach equilibrium which is automatically maintained within safe limits at the upper end of the cartridge by the normal exposure of the cartridge to heating or cooling by the atmosphere.

In carrying out the invention, a simple burner and control mechanism is provided with an adapter for receiving and puncturing a sealed cartridge of self-pressurizing fuel assembled therewith. The fuel found most satisfactory is a blended liquid hydrocarbon having a sufficient vapor pressure at ordinary temperatures to provide for lighting of the burner and having a rapidly increasing vapor pressure under rising temperatures from the burner to provide the necessary operating pressures for the burner.

The invention is illustrated in detail as supplied to the construction of blow torches, lanterns, and camp cook stoves, it being understood that it may be applied to almost any type of small portable burner equipment and even to small internal combustion engines.

In the drawings:

Figure 1 is a perspective view of a blow torch employing the invention;

Fig. 2 is a transverse vertical section through the blow torch and its assembled fuel cartridge, taken longitudinally of the burner barrel;

Fig. 3 is a transverse vertical central section taken at right angles to Fig. 2;

Fig. 4 is an enlarged detail section showing the fuel cartridge about to be assembled with the blow torch burner base, taken in the same plane as Fig. 2;

Fig. 5 is a top plan view of the fuel cartridge with the seal in place prior to assembly with a burner;

Fig. 6 is an enlarged detail section showing the construction of the cutter and adapter;

Fig. 7 is a transverse vertical central section through a lantern adapted to employ the invention;

Fig. 8 is a transverse horizontal section taken on line 8—8 of Fig. 7;

Fig. 9 is a perspective view of a single burner portable camp cook stove employing the invention;

Fig. 10 is a transverse vertical section through the burner, control valve and fuel cartridge of the stove shown in Fig. 9; and Fig. 11 is a detail elevational view of the stove showing the opening for access to the control valve and also the extended grating.

The invention in its broader aspects is present in each of the structures illustrated in the drawings, and which comprises, in general, a burner 1, a valve body 2 and the replaceable fuel cartridge or can 3 of self-pressurizing liquid hydrocarbon fuel.

The assembly of the fuel cartridge 3 with the valve head 2 automatically punctures the cartridge and provides for the passage of fuel from the cartridge or container to the valve control mechanism.

For this purpose the valve body is provided with an adapter 4 which receives the top of the cartridge can 3. The puncturing of the can preferably takes place as the can is assembled with the adapter and secured in place.

The adapter 4 illustrated in Figs. 1 to 5 is designed to receive and secure the particular can top illustrated. For different types of cans and cartridges various types of adapters may be employed.

Cans of the general shape illustrated and of about a pint in size are being manufactured in large quantities for the marketing of various products and are available for the making up of fuel cartridges 3 for the present invention. In the embodiment illustrated the can top or seal cap 5 has been reconstructed to provide a central threaded stem 6 for threading to adapter 4.

Cap 5 is assembled with can 3 after filling of the latter and is applied thereto in much the same manner as the caps of present day cans wherein the cap is inverted and pressed into place with the curved rim 7 confining the neck 8 and packing ring 9 around the can opening, and an expansion tool is applied to expand the side walls of the cap near the flat base and beneath the neck of the can to lock the cap in place. The cap 5 is thereby permanently secured to the can and cannot be removed therefrom without deforming the can so that it cannot be refilled and receive another cap.

The stem 6 comprises an internally threaded tubular member having a large thin flange 10 at its inner end soldered against the outer surface of the flat base of cap 5. The stem 6 extends upwardly from the flat base of cap 5 to a height approximately flush with the top rim of the cap.

The center of the base of cap 5 is formed upwardly to provide a small upward projection 11 registering with the central hole in stem 6, which serves to prevent inward yielding of the center of the cap under pressure from the cutter during puncturing of the cap, and also to prevent undesirable coating of the surface to be punctured with solder during soldering of the stem 6 to cap 5. It is desirable that the central projection 11 be free from solder to prevent interference with the puncturing operation.

The stem 6 has an internal seat 12 at its lower end to provide a seal with the adapter upon completion of the puncturing of cap 5.

For the specific form of fuel cartridge illustrated the adapter 4 is preferably a cast member inserted in the valve body 2 and comprises a downwardly extending stem 13 which is externally threaded to enter the thread in stem 6. A packing ring 14 disposed upon seat 12 in the bottom of the stem 6 is compressed by the end of stem 13 when the latter is threaded home in stem 6 to seal the joint against escape of fuel.

A vertical passage 15 in the adapter leads to a horizontal needle valve passage 16 in the valve body 2. A needle valve 17 is disposed in passage 16 with the stem 18 of the valve threaded in the valve body and extending outwardly through a suitable seal packing gland 19. A handle 20 is provided on the outer end of valve stem 18 for manual operation of the valve.

Inward threading of stem 18 by turning of handle 20 in one direction seats the needle valve 17 in the restricted throat 21 of passage 16 and closes the latter. Outward threading of stem 18 separates valve 17 from its seat 21 and allows fuel to flow through passage 16 and the connecting vertical passage 22 to the burner 1.

The puncturing device for adapter 4 comprises a tubular quill 23 pressed into passage 15 with its upper end in engagement with a shoulder and with its lower end projecting below stem 13 and tapered in both diameter and thickness to provide a cutting edge. It is preferable to bevel the cutting edge to provide a point at one side constructed of hard tool steel or the like.

The burner 1, illustrated in Figs. 1-4, comprises a horizontal tube 24 threaded upon a projection 25 of the cast valve body 2. The burner tube 24 connects with vertical passage 22 by means of a horizontal passage 26 in the valve body disposed axially of the burner tube.

The burner tube 24 has a plurality of openings 27 for admission of primary air thereto near the threaded end of the tube for mixture with the fuel discharged from passage 26. Secondary air is supplied at the outer end of the tube for complete combustion of the fuel.

A thin metallic shroud 28 may be secured to the valve body and may curve downwardly to skirt the upper end of the can 3. The shroud 28 protects the can against excessive heating from the burner and at the same time provides a sufficient heat enclosure for the upper gaseous space in can 3 to obtain the desired heat transfer down the walls of the can to maintain the desired gas pressure therein.

A suitable handle 29 may be secured to the shroud 28 to facilitate manual manipulation of the blow torch. When not being manipulated by handle 29 the blow torch may rest on the bottom of can 3.

It has been found that a blended liquid hydrocarbon fuel of a modified butane-pentane type will provide sufficient gas pressure at ordinary temperatures to effect starting of the torch, and that the pressure increases in the container as the latter becomes heated from the burner will provide the necessary gas pressure for blow torch action.

The fuel composition should be selected to prevent excessive pressures in the can at ordinary temperatures and the can should be relatively protected from the burner heat, since the necessary gas pressure can be developed by heat transfer to the can through the cast head constituting the adapter and valve body, particularly if the can is tipped in usage to bring the liquid fuel into contact with the can wall adjacent the shroud.

Where the can is kept upright, quill 23 receives only gaseous fuel from the gas space in the top of the can, and in this instance it becomes important to have a sufficient heat transfer from the burner to the outside can surface by radiation and from the burner through the valve body and adapter to the can by conduction to supply the heat of vaporization necessary to effect a continual boiling of the liquid fuel to replenish the gas. This boiling action generally requires so much heat that the liquid in the can will actually become cold or drop in temperature if left static without shaking. It is well, therefore, to provide for a predetermined constant heat supply to the liquid fuel in order to maintain the desired operating pressures. Tests indicate that temperatures as high as 250° F. are obtained at the coupling of the adapter and that such a temperature may be desirable as an indication of sufficient heat transfer to the can.

The can should be sufficiently strong to withstand the developed gas pressures which range from an initial pressure of about two pounds per square inch up to a possible operating pressure as high as fifty pounds per square inch.

Referring further to the fuel, a satisfactory composition is as follows:

| | Percent by weight |
|---|---|
| Normal butane | 52.3 |
| Isobutane | 2.2 |
| Isopentane | 43.5 |
| Normal pentane | 2.0 |

The above composition has a gas pressure of about 38.6 pounds per square inch absolute at 100° F. which is equivalent to about 24 pounds per square inch gauge pressure. For blow torch purposes the gauge pressure seldom exceeds 30 pounds per square inch. The fuel has a high B. t. u. rating and will produce a blue flame when the torch is burning that exceeds the heat of the ordinary blow torch flame.

In case of winter temperature, where it is desired to start the torch in zero weather, the can is sufficiently exposed and is of a convenient size for grasping the same by the hand warming it until enough gas pressure is produced. The thin metal wall of the can readily transmits the heat of the hand to the liquid fuel inside. If desired, after ignition of the burner under such conditions, an insulating wrapping may be applied to the can to prevent external cooling of the liquid in the can.

The can 3 should be only partially filled with the liquid since a substantial space for gas at the top should be provided for safety in shipping, to allow for expansion of the liquid under normal temperature increases.

The passage of stem 6 connects directly with the gas space at the top of the can and receives gaseous fuel from the can. This fact accounts for the ability to start the torch and to obtain a blue flame instantly after starting. No initial heating of the burner is required for starting the same in normal upright position. The valve 17 should be adjusted after starting and as the valve body heats up so that the fuel supply is coordinated to the pressures developed and the desired flame is maintained.

In use, the torch may be tipped to any position and may even be used upside down since after the valve body casting becomes heated it is immaterial whether liquid or gaseous fuel enters passage 15. Furthermore, since the pressure is obtained by boiling of the liquid the required gas pressure will be maintained so long as there is any liquid fuel in the can.

After using the torch the flame is extinguished by closing valve 17, and the fuel in the can 3 returns to normal temperatures and pressures relatively quickly since the can is exposed for cooling by the surrounding air.

When the can 3 is empty of fuel it is unthreaded from the adapter and discarded, and a new can 3 of fuel is assembled with the adapter. A can of fuel containing approximately .4 pound of liquid fuel will supply a normal sized torch with fuel for at least six hours of constant burning.

The invention provides a system whereby the fuel is shipped in sealed cartridges ready for use and which are safe against fire hazards in comparison to the bulk handling of gasoline.

The operation of the torch is safer than in the case of pressurized gasoline since the can 3 does not contain a combustible mixture of fuel and air and will not explode as will a torch tank containing gasoline and air under pressure. If a leak develops in the can the liquid fuel merely spews out under pressure and any flame can be readily extinguished by snuffing at the location of the leak.

In filling the can with liquid fuel (usually done at low temperatures to prevent gasification of the liquid during filling) it is well to have the can a little warmer than the liquid to start with so that the first few drops of liquid entering the can will vaporize and expel the air in the can.

The invention is adapted for supplying fuel to other forms of burners than blow torches, and the same fuel cartridge cans may be employed in each instance.

Figs. 7 and 8 show a mantle lantern adapted for use with the fuel cartridge of the invention. In this construction the same cast adapter and valve body 2 is employed on the top of the can 3, except that the shroud 28 and handle 29 may be eliminated.

The lantern comprises a lower circular base 30, an upper casting 31 constituting the burner support, and a glass lantern globe 32 disposed therebetween enclosing the lantern.

The base 30 has a plurality of vent openings 33 therethrough for supplying secondary air to the burner. A fuel tube 34 extends upwardly through base 30 to casting 31. The lower end of tube 34 has an elbow 35 to be threaded by suitable coupling means not shown, onto the valve body 2 for receiving fuel therefrom through passage 26. The upper end of tube 34 is threaded into casting 31 and connects with passage 36 leading to the downwardly extending inlet 37 for the mantle burner 38.

Primary air is mixed with the fuel in horizontal passage 39 and inlet 37. The passage 39 extends across casting 31 and connects at its opposite ends with a pair of vertical air supply tubes 40 extending upwardly from the bottom of base 30. Tubes 40 are open at their lower ends for the entrance of air thereto.

A suitable bail or handle 41 is pivoted to the opposite sides of casting 31, for carrying the lantern. If desired, a shade 42 may be supported on a post 43 extending upwardly centrally of casting 31.

The functioning of the fuel supply for the lantern is much the same as for the torch and need not be repeated.

The invention may be applied to portable camp cook stoves and the like as illustrated in Figs. 9, 10 and 11.

In this construction, the stove is made in two separate parts: one the adapter and valve body, and the other the stove burner and shroud.

The adapter and valve body comprises a single casting 44 constructed to be threaded upon the can stem 6 not shown, and to puncture the top of the can in the same manner as described for adapter 4.

It will be understood that the valve body contains the same passages 15, 16, and the same needle valve 17, stem 18, packing gland 19 and handle 20 as valve body 2, although only stem 18 and handle 20 are shown.

The discharge passage from the valve in valve body 44 is shown as a vertical central passage 45 which opens upwardly through a small projection 46 on the valve body casting, and which corresponds to passage 22 in the construction of Figs. 1–6, inclusive.

The stove burner and shroud comprises a cylindrical casing 47 adapted to slip downwardly over the upper end of can 3 with a horizontal perforate plate 48 for supporting a burner 49 centrally of the casing.

The burner 49 may be constructed of two sheet metal stampings: one constituting a pan-like bottom 50 with a downwardly extending central flanged opening 51 adapted to extend around the nozzle 45—46 of the valve body, and the other constituting a cover 52 for the member 50 and having a series of perforations 53 disposed in a circle near its outer edge.

The cover 52 is formed with a dome-like central portion 54 for deflecting fuel as it is discharged from nozzle passage 45 and mixing the same with primary air passing upwardly through opening 51 and radially to the outer edge of pan 50 where the mixture rises through perforations 53 to maintain combustion above the burner.

Secondary air is supplied to the burner around its circumference from beneath and between the burner and casing 47.

Both primary and secondary air is supplied to the burner through a series of perforations 55 in the body of casing 47.

The upper end of casing 47 carries a plurality of radial grate arms 56 and 57 for supporting a kettle or other cooking utensil at a predetermined height above the burner for heating the same. The grate arms 56 may be fixed while grate arms 57 may be pivotally mounted at their outer ends so that they may be positioned either inwardly adjacent arms 56 or outwardly to provide a larger stove top for larger cooking utensils.

The perforate plate 48 may carry a heat shroud 58 which extends outwardly from the flange of opening 51 and downwardly, loosely over the valve body and adapter. The shroud 58 is perforate to admit primary air to opening 51.

Shroud 58 has a downwardly opening slot 59 in one side adapted to receive valve stem 18. The shroud 58 serves to protect the can 3 against overheating from the burner.

The casing 47 has a large circular opening for registering with valve control handle 20 to permit access to the handle.

In assembling the stove, the fuel can is first assembled with the adapter and valve body and thereafter the burner is applied to the assembly.

Fuel cans or cartridges may be assembled in the stove in succession as the fuel in each can is used up.

The invention provides a construction and system for fueling portable burners with a gas which is less dangerous to handle and which has greater heat value than most fuels. The fuel is self-pressurizing from the heat of the burner, and in the case of cold weather, from the hand of the operator.

Various types of adapters may be employed depending upon the construction of the cartridge and of the cartridge holder.

One of the most important features of the present invention lies in the discovery that the pressures involved can be so controlled as to provide absolute safety with the use of light-weight cartridge cans. This is accomplished in two ways: first, the blended fuel is of a character which requires a substantial amount of heat in boiling to produce gaseous fuel from the liquid fuel, and the quantity of fuel in the cartridge is such that a boiling action must take place constantly in order to supply the amount of gas used by the burner so that the cartridge is never overheated, because the burner takes the gas at about the same rate it is generated; and second, with the use of fuel having a boiling point within the temperature ranges and pressures specified, the temperature of the cartridge as maintained by the atmosphere provides for the controlled vaporization of the liquid fuel within safe limits after the torch is in operation and provides adequate pressures for starting the torch at ordinary temperatures. It is further possible to provide a shroud between the burner and cartridge which is designed to control the passage of heat from the burner to the cartridge under ordinary operating conditions. Additional cooling fins 60 may be employed upon the valve body if desired.

It has been found that the various types of burners used with the present invention are considerably more safe than those employing former pressure fuel systems. They can be tipped over and operated in any position without danger. After lighting of the burner it makes no difference whether gaseous or liquid fuel enters from the cartridge through the adapter. The heat of the valve body and adapter is sufficient to continually gasify any liquid fuel entering the adapter before it reaches the needle valve.

Sufficient heat should be applied to the cartridge to maintain the necessary boiling action of the liquid and supply an adequate amount of gaseous fuel to the burner at all times.

While the invention is illustrated as applied to blow torches, lanterns and stoves, it may be employed in any type of apparatus requiring a combustible gas fuel. For instance, it may provide an excellent fuel system for small internal combustion engines operating on the injection principle.

The term burner as employed herein and in the claims is intended to include any apparatus effecting combustion of a gaseous fuel, and to specifically include torches, lamps, stoves, internal combustion engines, and the like.

While the coupling for securing the adapter to the cartridge is illustrated as comprised of a threaded member on each, it is possible to employ other types of couplings and even clamp means for holding the cartridge in place. The coupling provides the principal conduction of heat to the cartridge and as such should be of metal construction and of such size that the rate of heat conduction is sufficient to vaporize the fuel at the rate required by the system.

The term "self-pressurizing liquid fuel" as employed herein is intended to mean any liquid fuel having the general boiling and vapor pressure characteristics outlined above for operation of the burner and which will permit the use of generally small light-weight sealed containers. The liquid should be slow boiling at ordinary room temperatures so that any leakage will result in a refrigerating effect upon the liquid due to the free boiling action that slows the escape down to a safe and controllable amount. This means that hydrocarbons having a boiling point below that of butanes should not be present in any substantial amount since they tend to vaporize more rapidly upon leakage and are not as safe. Likewise, hydrocarbons having a boiling point above that of pentanes should not be present in any substantial amount since they increase the fractionation of vaporization of the blend to such an extent that it is difficult to completely utilize all of the fuel in the cartridge. The liquid generally requires a continuing supply of heat from the burner or some external source such as the hand of the operator in order to maintain the vapor pressures necessary to maintain the burner flame.

The initial boiling point of the liquid at atmospheric pressures should be somewhere between about 30° F. and 50° F. to provide for practical operation at room temperatures and at the same time avoid the dangers of excessive operating pressures.

The terms "sealed cartridge" and "sealed container" as employed herein is intended to include either a hermetically sealed container or one which has a controllable bleeder valve therein capable of automatic bleeder operation by assembly with the adapter. The container may be of metal, glass or any suitable composition so long as one wall of the container is adapted for bleeding fuel to an adapter when the latter is assembled therewith.

The invention may have various embodiments within the scope of the accompanying claims.

I claim:

1. A lightweight disposable fuel cartridge for small portable burners such as blowtorches and the like, comprising a thin-walled metal fuel container adapted to transmit heat readily to the fuel therein as when grasped by the hand of the operator to provide heat for pressurizing the fuel therein, a low pressure inflammable butane-pentane petroleum hydrocarbon liquid fuel partially filling said container, said fuel blend being capable of developing a gage pressure of the order of twenty-five pounds per square inch at 100° F., and non-removable means sealing said container and adapted to receive fuel bleeder means for controlled withdrawal of fuel therefrom, whereby a fuel supply of several hours burning capacity is provided and which can be readily transported, carried, stored and used with safety from fire hazard and from explosion.

2. A lightweight disposable fuel cartridge for small portable burners such as blowtorches and the like, comprising a thin-walled metal fuel container adapted to transmit heat readily to the fuel therein as when grasped by the hand of the operator to provide heat for pressurizing the fuel therein, a low pressure inflammable butane-pentane petroleum hydrocarbon liquid fuel partially filling said container and in which the butanes and pentanes are present in substantially equal amounts by weight, said fuel blend being capable of developing a gage pressure of the order of twenty-five pounds per square inch at 100° F., a cap permanently secured in the top of said container to close the same, and means carried by said cap to receive fuel bleeder means for controlled withdrawal of fuel therefrom.

References Cited in the file of this patent

UNITED STATES PATENTS

| | | |
|---|---|---|
| 1,364,972 | Andersone et al. | Jan. 11, 1921 |
| 1,795,560 | Johnston | Mar. 10, 1931 |
| 1,822,356 | McCartney et al. | Sept. 8, 1931 |
| 1,895,032 | Fisher | Jan. 24, 1933 |
| 2,064,535 | Greenfield et al. | Dec. 15, 1936 |
| 2,091,737 | Longway | Aug. 31, 1937 |
| 2,114,583 | Adams | Apr. 19, 1938 |
| 2,172,311 | Thomas | Sept. 5, 1939 |
| 2,209,956 | Chase et al. | Aug. 6, 1940 |
| 2,327,835 | White | Aug. 24, 1943 |
| 2,465,643 | Goss | Mar. 29, 1949 |
| 2,469,751 | Sweeney | May 10, 1949 |
| 2,482,794 | Peterson | Sept. 27, 1949 |
| 2,683,484 | Falligant | July 13, 1954 |